UNITED STATES PATENT OFFICE.

EDUARD WEISS, OF WEIDEN, GERMANY.

SAPONACEOUS COMPOUND.

954,486.　　Specification of Letters Patent.　Patented Apr. 12, 1910.

No Drawing.　Application filed June 21, 1906.　Serial No. 322,772.

*To all whom it may concern:*

Be it known that I, EDUARD WEISS, a subject of the German Emperor, and residing at Weiden, Kingdom of Bavaria, Empire of Germany, have invented a certain new and useful Improved Saponaceous Compound, of which the following is a specification.

The subject matter of my invention is an improved saponaceous compound for use in benzin.

Precisely the necessary quantity of the new saponaceous compound is added to the benzin acting upon a fabric, so that it is possible to dispense with washing the fabric in water, and fabrics, especially clothes, can be cleaned by means of the chemical washing process only.

My new saponaceous compound contains olein or other fat of animal or vegetable origin, and consists of ammonia and about 38% of water besides alcohol. This saponaceous compound is soluble in benzin, and it is added to the benzin with which the clothes are to be washed.

The new saponaceous compound is preferably used in the following proportions: For from five to six ladies' dresses 0,5 to 0,75 kilograms, and for five men's suits of clothes or five to ten square meters of carpets 1 kilogram of my new saponaceous solution is to be added to the benzin with which the articles are to be treated. The articles to be cleaned are subjected in the centrifugal washing-machine to the action of benzin and the added saponaceous compound for about 15 to 20 minutes in the case of ladies' dresses and about 30 to 45 minutes in the case of men's clothes and carpets. After this treatment with benzin and the saponaceous compound the articles are treated with benzin alone in the centrifugal washing-machine, after which they are centrifuged and dried in a moderate heat in the well known manner.

When using the new saponaceous compound serving for the herein described method of washing, grease spots as well as stains due to other substances, such as beer, sauce, road-dirt and blood, which are soluble in water only, are easily and completely removed during the washing with benzin owing to the action of the ammonia and the water.

In the methods of washing known heretofore, in which benzin and a saponaceous solution containing very little water and a little alkali have also been used, the spots could not be removed in the same manner as in accordance with this new method. Therefore it has heretofore been necessary to wash the fabrics in water, as these spots in ladies' dresses, men's clothes, carpets and the like are apt to be often so numerous that to remove each separately would require too much time and therefore cause a great deal of expense.

A saponaceous compound, which is especially adapted for the described method of washing is obtained by heating about 20% ammonia of 25% strength, by weight, 9% alcohol and 23% water, and by then adding thereto about 47% oleic acid, that is olein, and by boiling the whole mixture. In this manner a saponaceous compound is obtained containing about 5,3% anhydrous ammonia, 9% alcohol, 38% water and 47% olein, which compound, as is clear, contains a large amount of water and ammonia in excess. The proportions here indicated may however be varied; for example, while retaining about the same quantity of alcohol and oleic acid the quantity of anhydrous ammonia may vary from $3\frac{1}{2}$% upward and that of water from 25% upward.

I claim:

A composition of matter, the constituent ingredients of which are substantially as follows:—five and one third parts anhydrous ammonia, nine parts alcohol, thirty-eight parts water and forty-seven parts olein, substantially as described, and for the purpose specified.

In testimony whereof I affix my signature in presence of two witnesses.

EDUARD WEISS.

Witnesses:
　OSCAR BOCK,
　JOHANN WOLF.